United States Patent
Marcolongo et al.

(10) Patent No.: US 8,877,284 B2
(45) Date of Patent: Nov. 4, 2014

(54) METHOD FOR MAKING A FLEXIBLE AND CLEAR LOW SURFACE ELECTRIC RESISTANCE PLASTICS MATERIAL ARTICLE OF MANUFACTURE AND THE PLASTICS MATERIAL ARTICLE MADE THEREBY

(75) Inventors: Gabriele Marcolongo, Padua (IT); Moreno Meneghetti, Padua (IT)

(73) Assignee: IVG Colbachini S.p.A., Cervarese Santa Croce (PD) (IT)

( * ) Notice: Subject to any disclaimer, the term of this patent is extended or adjusted under 35 U.S.C. 154(b) by 666 days.

(21) Appl. No.: 12/799,869

(22) Filed: May 4, 2010

(65) Prior Publication Data
US 2010/0288981 A1  Nov. 18, 2010

(30) Foreign Application Priority Data
May 15, 2009 (IT) .................................. MI09A0846

(51) Int. Cl.
  *H01B 1/24* (2006.01)
  *H01L 51/00* (2006.01)
  *B82Y 40/00* (2011.01)
  *C08J 7/06* (2006.01)
  *B29K 105/16* (2006.01)

(52) U.S. Cl.
  CPC ............ *H01B 1/24* (2013.01); *B29K 2105/167* (2013.01); *C08J 7/06* (2013.01); *C08J 2327/12* (2013.01); *Y10S 977/742* (2013.01); *Y10S 977/753* (2013.01); *Y10S 977/778* (2013.01); *Y10S 977/827* (2013.01)
  USPC ........... 427/122; 252/500; 252/502; 252/511; 977/742; 977/753; 977/778; 977/827

(58) Field of Classification Search
  CPC ........ B82Y 30/00; B82Y 40/00; B82Y 99/00; B82Y 20/00
  USPC .......... 252/500–511; 427/122; 977/742, 753, 977/778, 827
  See application file for complete search history.

(56) References Cited

U.S. PATENT DOCUMENTS

| | | | |
|---|---|---|---|
| 2002/0161101 A1* | 10/2002 | Carroll et al. ................. | 524/495 |
| 2003/0122111 A1* | 7/2003 | Glatkowski ................... | 252/500 |
| 2003/0164427 A1* | 9/2003 | Glatkowski et al. ...... | 244/158 R |
| 2004/0099438 A1* | 5/2004 | Arthur et al. ................. | 174/257 |
| 2005/0186378 A1* | 8/2005 | Bhatt ........................... | 428/36.9 |
| 2006/0188721 A1* | 8/2006 | Irvin et al. .................... | 428/402 |
| 2006/0274049 A1* | 12/2006 | Spath et al. ................... | 345/173 |
| 2008/0088219 A1* | 4/2008 | Yoon et al. .................... | 313/326 |
| 2010/0009165 A1* | 1/2010 | Patel et al. .................... | 428/323 |
| 2010/0055589 A1* | 3/2010 | Qi et al. ......................... | 430/71 |
| 2010/0098904 A1* | 4/2010 | Dai et al. ...................... | 428/119 |
| 2012/0177905 A1* | 7/2012 | Seals et al. .................... | 428/221 |

OTHER PUBLICATIONS www.boekeker.com ("PTFE, FEP, and PFA Specifications". obtained via the web.archive.org website for the date of Apr. 28, 2009.*

* cited by examiner

*Primary Examiner* — Tri V Nguyen
(74) *Attorney, Agent, or Firm* — Hedman & Costigan, P.C.; James V. Costigan; Kathleen A. Costigan

(57) ABSTRACT

A method for making a flexible and clear plastics material article of manufacture having a low electric surface resistance, starting from a plastics material having a higher electric surface resistance, in which the electric surface conductivity of the starting article of manufacture is modified by partially including, into at least a portion of the outer surface of the article, carbon nanotubes.
With respect to conventional methods, the inventive method allows to modify the starting plastics material electric surface resistance so as to lower it to values smaller than $10^2$ k$\Omega$/sq, even starting from articles having a higher resistance of the order of $10^{13}$ k$\Omega$/sq, while preserving the starting clearness and flexibility thereof.

8 Claims, 4 Drawing Sheets

METHOD FOR MAKING A FLEXIBLE AND CLEAR LOW SURFACE ELECTRIC RESISTANCE PLASTICS MATERIAL ARTICLE OF MANUFACTURE AND THE PLASTICS MATERIAL ARTICLE MADE THEREBY

BACKGROUND OF THE INVENTION

The present invention relates to a method for making a flexible and clear plastics material article of manufacture having a low surface electric resistance.

The invention also relates to the plastics material article of manufacture made by the method.

As is known, in making some flexible and clear plastics material articles of manufacture, for example inner liner of tubes for conveying fluid materials in general, it is necessary to provide the plastics material with electrical conduction properties, while preserving both the flexibility and clearness characteristics of the plastics material itself.

The present invention allows to modify, for example, the properties of high chemical resistance thermoplastic polymers such as polyethylene, polypropylene, polybutadiene, polyamide 6.6, polyvinylchloride, polyacrylonitrylebutadienestyrene (ABS), fluorinated polymers, such as polytetrafluoroethylene (Teflon), tetrafluoroethylene, hexafluoropropylene and vinylidene fluoride (THV) terpolymers, a tetrafluoroethylene and perfluoroalkylvinylether (PFA) copolymer, a tetrafluoroethylene and perfluoroethylvinylester (MFA) copolymer and a 1-propene, 1,1,2,3,3,3-hexafluoro-polymer with tetrafluoroethene (polyfluoroethylene-propylene, FEP), the latter being used for example for making clear inner liner or sheath elements of flexible hoses, but having such a high surface resistance, of the order of $10^{13}$ k$\Omega$/sq, as to generate electrostatic charge accumulating problems, as they are used for conveying fluid materials.

A modification of the surface conductivity properties of the above mentioned materials has been made by applying on their surface carbon nanotubes (CNT), which represent an electrically conductive material with a very good chemical resistance and mechanical strength, compatible with the above mentioned polymeric polymers, while preserving the optical clearness and flexibility properties of the starting polymeric material.

Single and multiple wall carbon nanotubes CNT have been synthesized at the start of 1990. They represent a novel form of a nanostructured carbon based material (the single wall tubes have, for example, diameters of an order of a nanometer and lengths of an order of micrometers), which has mechanical strength, flexibility and electrical conduction properties which could not be found in other prior materials.

Carbon based materials, such as Carbon Black, are conventionally used for modifying the electric resistance of polymeric materials, into which they are included by a mechanical mixing and a subsequent melting of the composite material or by including them into the polymeric material as dissolved in suitable solvents.

The thus made materials, however, are, starting from surface resistances larger than hundreds k$\Omega$/sq, not clear but deeply black, because their light absorption due to their carbon black contents.

On the other hand, said CNTs have the advantage that due to their unidirectional nature, they posses a percolating conductive limit at carbon concentrations much less than those which may be obtained from Carbon Black.

With respect to the carbon nanotube polymeric composite materials, in particular fluorinated polymers, the related literature is a very poor one and discloses only few works teaching to make carbon nanotubes composite materials from a solution for example of soluble fluorinated polymers such as Nafion, or by a mechanical mixing method, see for example B. J. Landi, R. P. Raffaelle, M. J. Heben, J. Alleman, W. VanDerveer, T. Gennett, Single Wall Carbon Nanotube—Nafion composite actuators, Nano Letters, vol. 2, page 1329, year 2002; J. Wang, M. Musameh, Barbon nanotube/Teflon composite electrochemical sensors and biosensors, Anal. Chem. Vol 75, page 2075, year 2003; K. El-Hami, K. Matsushige, Covering Single Wall Carbon Nanotube by the ply (VDF-co-TrFE) copolymer, Chem. Phys. Lett. Vol. 368, page 168, year 2003.

In particular the prior art in this field only teaches to include the carbon nanotubes by a mechanical mixing operation and a subsequent melting, or by dissolving the polymeric material into a solvent.

However, in such a method, the very high hydrophobic nature of a number of thermoplastics polymers and, in particular, fluorinated polymers, causes a strong interaction with the CNTs, with a consequent high difficulty in providing percolating path patterns as necessary for making a low electric resistivity composite material.

The above mentioned prior art shows that acceptable electric conductivities may be achieved only by an amount of CNTs providing a deeply black very expensive material.

The Applicants have found, from tests in which SWNT nanotubes were directly dispersed into a fluorinated polymer, in particular FEP, either molten or dissolved, that, this polymer does not allow to make a clear electrically conductive composite material, with an acceptable electrical conductivity and a sufficient clearness.

The scientific literature in this field, further discloses a possibility of making carbon nanotubes by filtering solutions in which said nanotubes are either dissolved or dispersed by dissolving or dispersing agents. For example, a method for making ultra-thin films, having a low electrical resistance and a sufficient clearness, has been shown in "Science (Transparent Conductive Nanotubes Films, Zhuan-chung et. al., Science, 305, 1273 (2004))".

This prior method, however, comprises a plurality of complex operating steps such as to use dispersing agents and a depositing substrate to be successively eliminated, with a final transfer to an end support, and cannot provide high electric conductivity articles, such as the fluoropolymer based tube liners, even if the above authors have stressed the possibility of using said CNTs as unidimensional system for making good electrical conductivity ultra-thin films, and have attempted to design a simple industrial scale method to deposit a CNT based conductive material thin film on polymeric articles and firmly anchor this conductive film on the article surface, while limiting negative phenomena related to a deep embedding of said nanotubes into the polymeric material, for preventing in turn the electric conductivity of the article from excessively lowering.

SUMMARY OF THE INVENTION

Accordingly, the aim of the present invention is to provide a method for making a flexible and clear plastics material article of manufacture, also having a good surface electric conductivity, (preferably less than $10^2$ k$\Omega$/sq) starting from a plastics material article in particular a fluorinated polymer article having a comparatively high electric resistance (larger than $10^{13}$ k$\Omega$/sq).

Another object of the invention is to provide such a clear flexible plastics material article having a low surface electric resistance preferably less than $10^2$ k$\Omega$/sq.

The method and article of manufacture according to the present invention, and preferred embodiments of the invention are disclosed in the accompanying claims.

BRIEF DESCRIPTION OF THE DRAWINGS

The above mentioned aim, objects, advantages and characteristics will become more apparent hereinafter from the following detailed disclosure of a preferred embodiment of a method and plastics material article according to the invention, with reference to the figures of the accompanying drawings, where.

Figure 1:
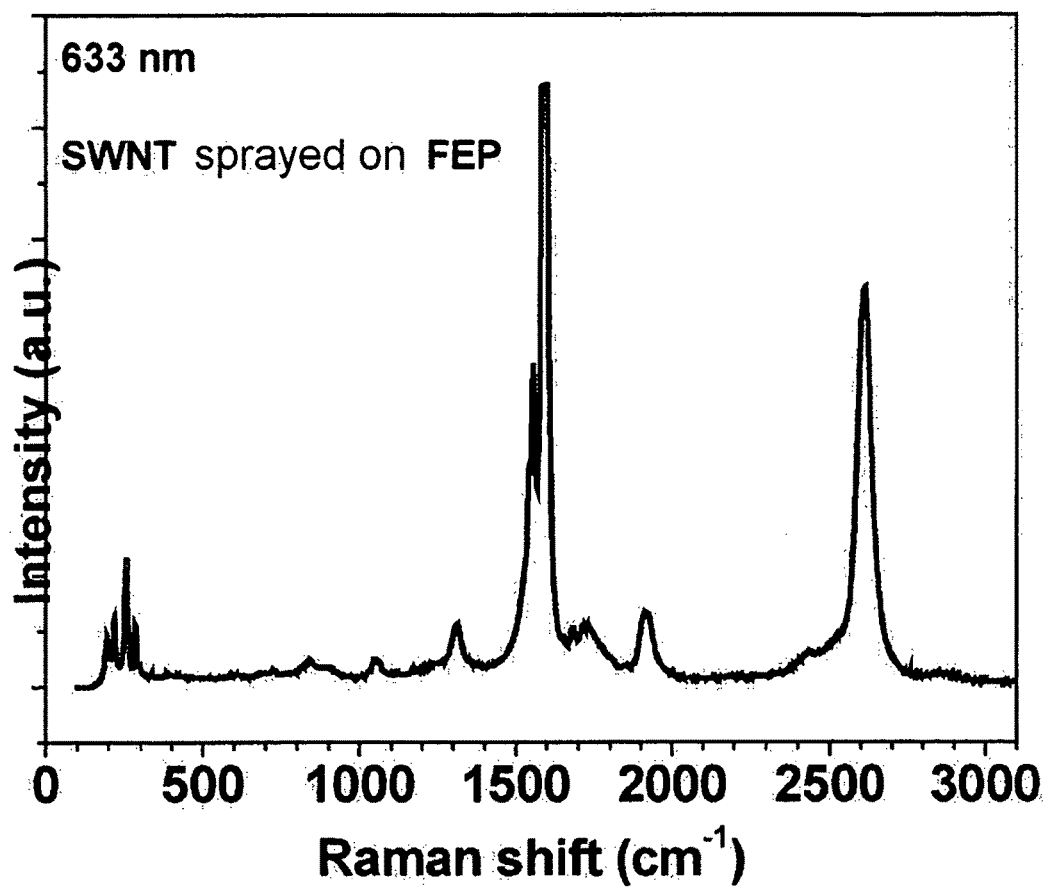
FIG. 1 shows a Raman spectrum of the FEP conductive surface with included carbon nanotubes, said spectrum being characteristic of single wall nanotubes.
Figure 2:
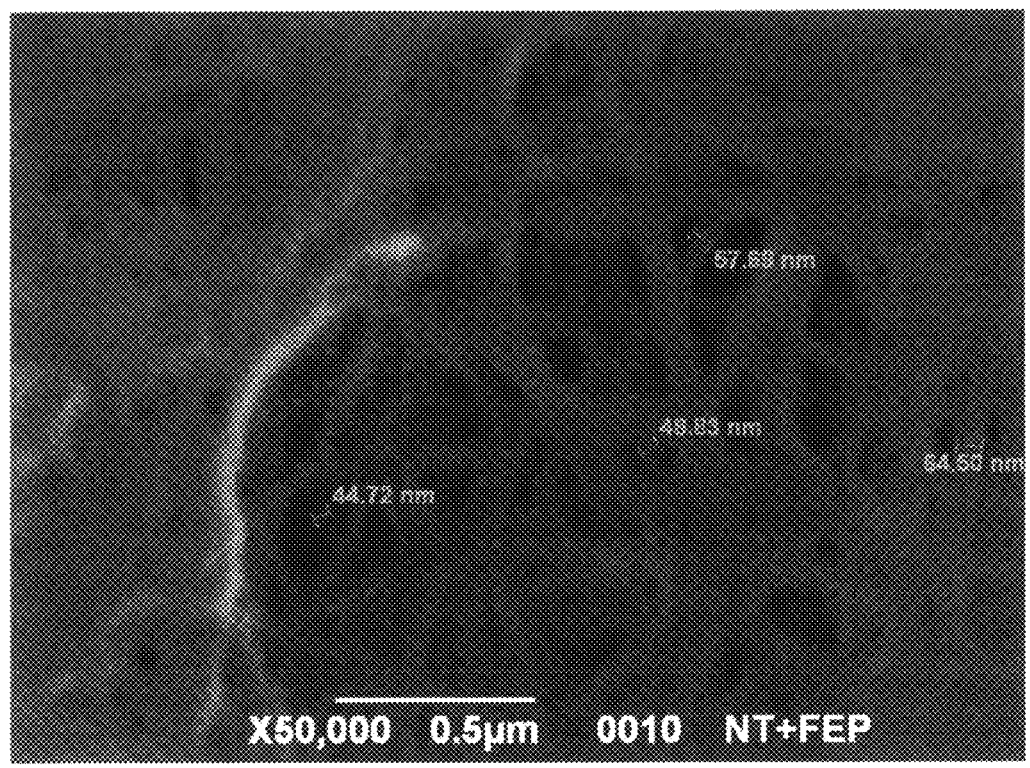
FIG. 2 shows a SEM image of the conductive surface of the FEP material, the carbon nanotubes being shown as interconnected nanotube beams.
Figure 3:
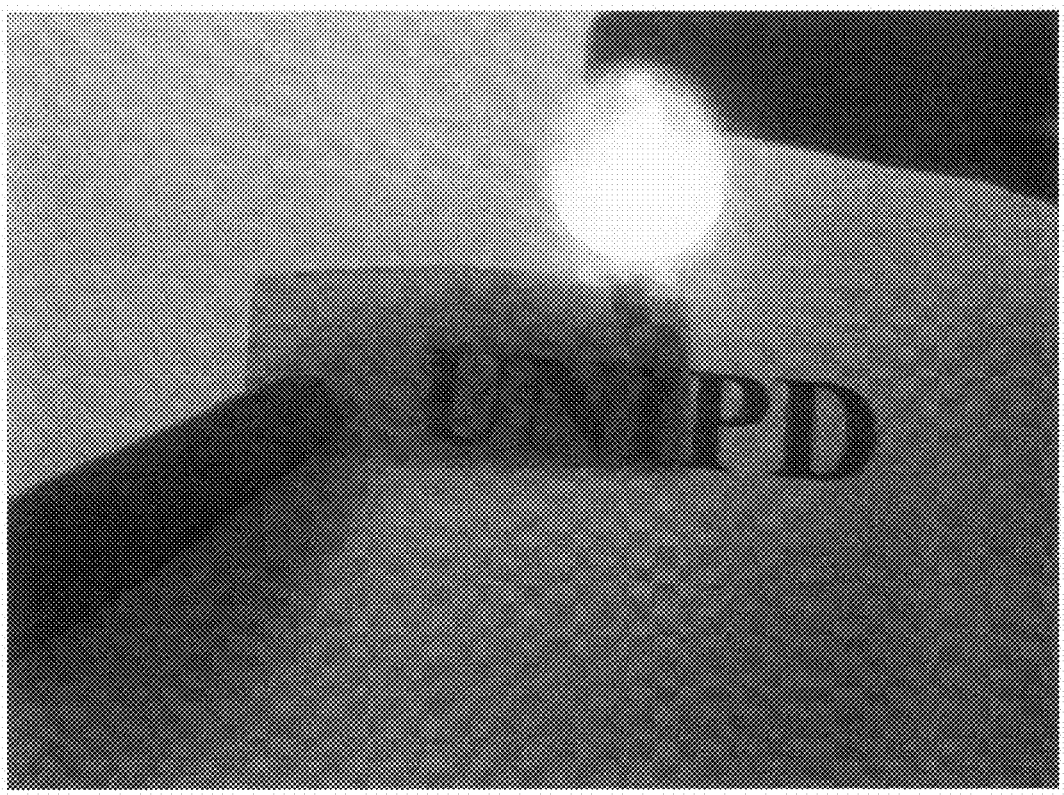
FIG. 3 shows a demonstration of the electric conductivity (switching on of the LED) of the FEP processed surface and a simultaneous clearness of the material.

(1) heated melter for the polymeric material;
(2) extruder;
(3) extruding nozzle;
(4) carbon nanotubes suspending solvent tank;
(5) displacement pump;
(6) on-line ultrasound processing device;
(7) carbon nanotubes atomizing-applying device;
(8) heater;
(9) cooler;
(10) inert gas/air feeding tube;
(11) composite article of manufacture.

DESCRIPTION OF THE PREFERRED EMBODIMENTS

The composite material is herein made by applying a ultrathin CNT film directly on the surface of a fluorinated polymer and a firm attachment or anchoring of said film to the polymer surface is achieved by softening the article at a temperature near to its melting temperature, thereby allowing the CNTs to be partially embedded into the polymeric matrix, to allow said CNT film to preserve its surface electrical conductive properties.

The CNT film has good electrical conductive, clearness and flexibility properties, thereby composite materials made thereby will have a low surface electric resistance, a good clearness and flexibility.

Preferably, the CNTs are dispersed or suspended in a volatile liquid by an ultrasound processing method and then being deposited on the polymeric material by a spraying method.

According to a preferred embodiment, the inventive method comprises the steps of:

(a) preparing a CNT suspension or dispersion in said volatile liquid;

(b) applying said CNT suspension or dispersion, of said step (a) by a spraying process on at least a surface portion of said plastics material article;

(c) heating said plastics material article, of said step (b) to at least its softening temperature, thereby causing a partial inclusion of said CNTs thereinto;

(d) cooling the composite plastics material article of said step (c) up to cause it to solidify.

According to a further preferred embodiment, the inventive method comprises the step of spraying the CNT suspension on the surface of the softened polymeric article, preferably in the article extruding process.

According to a modified embodiment, the inventive method further comprises the step of depositing said CNTs on the polymeric material heated to different temperatures.

The starting plastics material used for making the article according to the present invention is a plastics flexible and clear material, a thermoplastic polymer, selected, preferably though not exclusively, from polyethylene, polypropylene, polybutadiene, polyamide 6,6, polyvinylchloride, polyacrylonitryle-butadienestyrene (ABS), fluorinated polymers, such as polytetrafluoroethylene (Teflon), a tetrafluoroethylene, hexafluoropropylene and vinylidene fluoride (THV) terpolymer, a tetrafluoroethylene and perfluoroalkylvinylether (PFA) copolymer, a tetrafluoroethylene and perfluoroethylvinylester (MFA) copolymer and a tetrafluoroethene-1-propene,1,1,2,3,3,3-hexafluoro-polymer (polyfluoroethylenepropylene, FEP).

If FEP is used, then the starting plastics material softening temperature is of about 260° C. and, by carrying out the inventive method, its surface electric resistance decreases from a starting value of $10^{13}$ k$\Omega$/sq, to an end value of $10^2$ k$\Omega$/sq or less.

The CNTs to be used in the invention are both single wall carbon nanotubes, SWNT, double wall nanotubes, DWNT, and multi-wall nanotubes MWNT.

The carbon nanotubes may be used as such, or they may be purified by thermal and/or chemical methods to improve their quality, conductive nature and their dispersing in their solvent.

The invention further provides to process the carbon nanotubes, either in a non purified or purified condition thereof, by a volatile organic solvent to provide a suspension in which they are as finely dispersed as possible.

Such a dispersion may be made by a mechanical stirring device and, preferably, by an ultrasound dispersing apparatus.

The ultrasound dispersing method may be carried out by an "on-line" ultrasound dispersing process, as said nanotubes are applied to the polymeric material.

The dispersing step is carried out either under a closed atmosphere or an inert gas to prevent any contamination with the atmospheric moisture and the solvent from evaporating.

With the nanotubes dispersed in said solvent, the mixture may be optionally subjected to a controlled temperature from 10 to 100° C., preferably from 15 to 60° C.

The nanotubes suspending solvent is selected from organic inert and volatile solvents, preferably, though not exclusively, dichloromethane, dichloroethane, 1,1,1-trichloroethane, chloroform, carbon tetrafluoride, tetrachloromethane, carbon sulphide, toluene, xylene, tetrahydrofuran, dioxane, 1,2-dimethoxyethane, terz-butylmethylether, diisopropyl-ether, actone, methylethylketone, methylisobutylketone, hexane, heptane, isooctane, cyclohexane, oil ether, ethyl acetate, methyl acetate, butyl acetate, methanol, ethanol, isopropanol, n-butylalcohol, iso-butylalcohol, terz-butylalcohol, amylalcohol, acetonitrile, propionitrile, benzonirile, nitromethane, nitroethane, dimethylformamide, dimethylacetamide, dimethylsulphoxide, N-methyl-2-pyrrolidone, ethylen-glycole, propylenglycole, diethylenglycole, dimethylcarbonate, diethylcarbonate, propylidene-carbonate, 2,2,2-trifluoroethanol, trifluoroacetic acid, perfluoroheptane and perfluorohexane.

Said nanotubes may be also suspended in a pure solvent or in a mixture of two or more solvents.

According to a first embodiment of the inventive method, the dispersed nanotube surface application is performed on a raw plate like polymeric article, by an atomizing spray system, in which the nanotube suspension, as thermostatically controlled and optionally continuously mixed by an on-line ultrasound device, is pumped through a tube by a conveying pump, or an ejecting system, driven by pressurized air or nitrogen, to an atomizing device, to spray the suspension on a surface of the article.

The thus made article is then heated by electric, radiating or microwave heating devices, to a softening condition to allow the nanotubes to be anchored to the article; optionally, said article may be also subjected to a molding operation to provide any desired configurations thereof, and may be further washed to remove therefrom possible loose nanotube residues, to be finally dried.

A second embodiment of the method according to the present invention provides to surface apply the solvent dispersed nanotubes on the plastics article as the latter is extruded, preferably before hardening it. This embodiment of the method, in particular, is performed by a spray atomizing system in which the nanotube suspension, with a controlled temperature and optionally continuously mixed by an on-line ultrasound device, is conveyed, through a conveying tube, by a displacement pump, or a pressurized or nitrogen driven ejector, to an atomizing device, thereby spraying said suspension on the article surface.

The thus made article is optionally held at a target temperature, by an electric, infrared or microwave heating device, to cause the atomized solvent to evaporate, while leaving on the article surface the nanostructured material thin layer.

The solvent vapors being suitably discharged, condensed and recovered.

Figure 4:
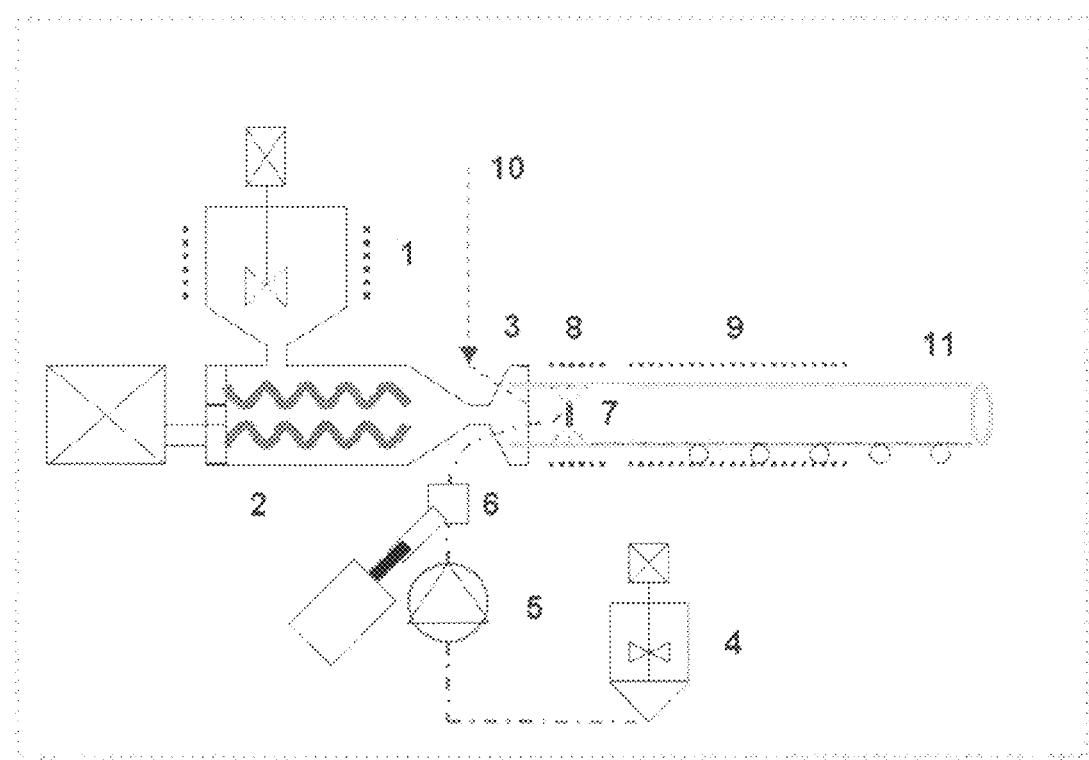
FIG. 4 shows an apparatus for surface applying carbon nanotubes to the polymeric article of manufacture during the extruding thereof, wherein the numerals represent, respectively.

As the article comprise a plastics material tube, it is made by a conventional hot extruding system for hot extruding thermoplastic polymers, said system including a polymer melting vessel, a high pressure pump for pumping molten polymer, an extruding apparatus proper, schematically shown in FIG. 4, and comprising an atomizing device including a stirred tank for the carbon nanotubes suspended in a solvent or solvent mixture, a pressurized transfer pump, an on-line electric heater, an on-line ultrasound dispersing device, a stainless steel tube and an atomizing nozzle.

Alternately, the nanotube suspension may be conveyed to the atomizing nozzle without pumps, but by properly designing the ejecting nozzle, and driving it by a pressurized gas selected from pressurized air and nitrogen.

The atomizing nozzle is arranged at a distance of about 3-15 cm from the extruding plane in a radial spraying direction.

The extruding and atomizing device may also comprise an inert gas feeding tube, for removing solvent vapors and conveying them to the open end portion of the article and then to a removal device.

The application of the nanotube suspension to the article is performed according to homogeneity criteria so as to provide a target surface electric resistance value of $10^2$ kΩ/sq or less. In a system for continuously extruding tubes for example, the target surface resistance value is achieved by properly modulating the extruding speed and atomized suspension flow.

The invention will be further disclosed hereinafter by some illustrative but not limitative examples, disclosing the method used for applying by spraying the CNTs, starting from a highly dispersed solvent mixture and for anchoring said nanotubes to the surface of the article by partially including them into the softened polymer, thereby providing articles having good surface electric conductivity and clearness properties, while preserving the flexibility characteristics of the polymeric material.

EXAMPLE 1

Preparing of a Suspension of Carbon Nanotubes in Dichloromethane 100 mg of single wall carbon nanotubes SWNT have been suspended in 100 ml dichloromethane at 20° C. The mixture has been homogenized by a direct ultrasound processing for 30 minutes with a 10 W/mm$^2$ power, and on/off cycles of 3/7 sec.

EXAMPLE 2

Preparing of a Suspension of Carbon Nanotubes in Dimethylformamide 150 mg of single wall carbon nanotubes SWNT have been suspended in 100 ml dimethylformamide at 45° C. The mixture has been subjected to a homogenizing operation by an indirect ultrasound continuous treatment by in a bath system for 40 minutes with a 200 W power.

EXAMPLE 3

Preparing of a Suspension of Carbon Nanotubes in a Tetrahydrofuran and Dimethylformamide Mixture 100 mg of single wall carbon nanotubes SWNT have been suspended in a mixture comprising 95 ml tetrahydrofuran and 5 ml dimethylformamide at 20° C. The mixture has been subjected to a homogenizing operation by a direct ultrasound treatment for 20 minutes with a 12 W/mm$^2$ power, and on/off cycles of 4/6 sec.

EXAMPLE 4

Surface Application by a Spray Method of Carbon Nanotubes to a Flat Plate Article of a Fluorinated Polymer FEP A suspension of single wall carbon nanotubes SWNT in dichloromethane, made according to the Example 1, has been sprayed by an ejecting atomizing device driven by pressurized air at $2\times10^5$ on a fluorinated polymer FEP plate. The plate has been then subjected to an infrared radiation source to soften the polymer and has been heated for further 10 minutes. The thus made article has been cooled to room temperature, washed by acetone and dried in air.

The article had a transmittance of 68% at 600 nm, and a surface electric resistance of $0.75\times10^2$ kΩ/sq.

EXAMPLE 5

Application by a Spray Method of Carbon Nanotubes on the Inner Wall of a Fluorinated Polymer FEP Extruded Tube A suspension of 100 mg of single wall carbon nanotubes SWNT in dichloromethane/dimethylformamide 95:5 vol/vol, made according to the Example 3, has been sprayed by a spraying atomizing device driven by a metering pump.

In the sprayed suspension conveying duct, between the pump and atomizing nozzle, was on-line arranged a ultrasound homogenizing device to improve the nanotube dispersion, the atomizing device consisting of a modified conventional extruded thermoplastic polymer tubes atomizing device, with the atomizing nozzle arranged at a distance of about 5 centimeters from the extruding plane in a radial spraying direction of a infrared radiation to soften the polymer, the extruded tube being held in its softened condition up to a distance of about 10 cm from the extruding plane by an outer electric heater.

Upstream of the hot region outside the tube being formed were arranged a plurality of cooling air nozzles to solidify the tube and anchor on its inner wall the nebulized carbon nanotubes. The extruding and nebulized nanotubes applying process being continuously performed up to a desired tube length.

The end article of manufacture was then washed by a suitable washing solvent or cleansing aqueous solution and then dried, and was characterized by a transmittance of 64% at 600 mm and a surface electric resistance of $0.46\times10^2$ kΩ/sq.

As shown in FIG. 3, a clear FEP article having a very low electric resistance of the order of 1 kΩ/sq has been achieved, as desired.

The presence of nanotubes on the FEP article surface has been controlled both by a Raman spectroscopic method (FIG. 1) and an electronic scanning microscopic image pattern (FIG. 2). It has been further possible to verify the stability of the deposited nanotubes, by ultrasound processing the composite material in methylenechloride and controlling that its surface resistance was not modified.

With respect to the modified FEP material conductivity, it is shown in FIG. 3 that, by using the article as a conductor, it is possible to switch on a LED while observing wordings under the article.

In accordance to Examples 4 and 5, flexible and clear low electric surface resistance plastics material articles have been made starting from the following thermoplastic polymeric materials: polyethylene, polypropylene, polybutadiene, polyamide 6,6, polyvinylchloride, polyacrylonitryle-buthadienestyrene (ABS), polytetrafluoroethylene (Teflon), a tetrafluoroethylene, hexafluoropropylene and vinylidene fluoride (THV) terpolymer, a tetrafluoroehtylene and perfluoroalkylvinylether (PFA) copolymer, and a tetrafluoroehtylene and perfluovinylester (MFA) copolymer.

The invention claimed is:

1. A method for making a flexible and clear extruded plastic material article of manufacture having a low surface electric resistance, starting from a flexible and clear extruded plastic material article having a higher surface electric resistance, said method comprising the step of modifying the surface electric conductivity of said flexible and clear extruded plastic material article during the extrusion process by preparing a suspension or a dispersion of carbon nanotubes highly dispersed in a volatile liquid by an ultrasound process;

heating at least a portion of said flexible and clear extruded plastic material article to its softening temperature to form a heat softened flexible extruded clear plastic material article;

spraying said suspension or dispersion of carbon nanotubes on said at least a portion of said heat softened flexible and clear extruded plastic material article to allow said carbon nanotubes to be partially embedded into said at least a portion of said heat softened flexible and clear extruded plastic material article to firmly anchor to said at least a portion of said heat softened flexible and clear extruded plastic material article to provide surface electrical conductive properties; and cooling the heat softened flexible and clear extruded plastic material article to solidify said flexible and clear extruded plastic material article.

2. A method according to claim 1, characterized in that said carbon nanotubes are dispersed or suspended in a volatile liquid selected from dichloromethane, dichloroethane, 1,1,1-trichloroethane, chloroform, carbon tetrafluoride, tetrachloromethane, carbon sulphide, toluene, xylene, tetrahydrofuran, dioxane, 1,2-dimethoxyethane, tert-butylmethylether, diisopropyl-ether, actone, methylethylketone, methylisobutyl-ketone, hexane, heptane, isooctane, cyclohexane, oil ether, ethyl acetate, methyl acetate, butyl acetate, methanol, ethanol, isopropanol, n-butylalcohol, iso-butylalcohol, terz-butylalcohol, amylalcohol, acetonitrile, propionitrile, benzonirile, nitromethane, nitroethane, dimethylformamide, dimethylacetamide, dimethylsulphoxide, N-methyl-2-pyrrolidone, ethylene glycol, propylene glycol, diethylenglycole, dimethylcarbonate, diethylcarbonate, propylidene-carbonate, 2,2,2-trifluoroethanol, tri-fluoroacetic acid, perfluoroheptane and perfluorohexane.

3. A method according to claim 2, characterized in that said carbon nanotubes are dispersed or suspended in a pure solvent or in a mixture of two or more of said solvents.

4. A method according to claim 1, characterized in that said plastics material comprises a thermoplastic polymer selected from polyethylene, polypropylene, polybutadiene, polyamide, 6,6 polyamide, polyvinylchloride, polyacrylonitryle-butadienestyrene (ABS) or a fluorine polymer.

5. A method according to claim 4, characterized in that said fluorine polymer comprises 1-propene, 1,1,2,3,3,3-hexafluoride or a tetrafluoro-ethene polymer.

6. A method according to claim 5 where the tetrafluoroethene polymer is polyfluoroethylene-propylene (FEP).

7. A method according to claim 1, characterized in that said carbon nanotubes comprise single wall nanotubes (SWNT), double wall nanotubes (DWNT) or multi wall nanotubes (MWNT).

8. A method according to claim 7, characterized in that said carbon nanotubes comprise single wall nanotubes (SWNT).

* * * * *